US012012793B2

(12) United States Patent
Bairagi et al.

(10) Patent No.: US 12,012,793 B2
(45) Date of Patent: Jun. 18, 2024

(54) APPLIANCE DOOR HINGE ASSEMBLY

(71) Applicant: WHIRLPOOL CORPORATION, Benton Harbor, MI (US)

(72) Inventors: Gaurav Ramdas Bairagi, Jalgaon (IN); Ganesh Bramhane, Pune (IN); Pradeep Shankar Thorat, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 785 days.

(21) Appl. No.: 16/683,898

(22) Filed: Nov. 14, 2019

(65) Prior Publication Data

US 2021/0148146 A1 May 20, 2021

(51) Int. Cl.
*E05D 7/00* (2006.01)

(52) U.S. Cl.
CPC .... *E05D 7/0045* (2013.01); *E05D 2007/0072* (2013.01); *E05Y 2900/308* (2013.01)

(58) Field of Classification Search
CPC .......... E05D 7/0045; E05D 2007/0072; E05Y 2900/308
See application file for complete search history.

(56) References Cited

U.S. PATENT DOCUMENTS

| | | | | |
|---|---|---|---|---|
| 2,180,573 A | 11/1939 | Wiley | | |
| 2,198,346 A | 4/1940 | Little | | |
| 2,552,373 A | 5/1951 | Hardwick | | |
| 4,021,968 A | 5/1977 | Kendall | | |
| 4,665,892 A | 5/1987 | Spargo et al. | | |
| 5,966,873 A | 10/1999 | Jerg et al. | | |
| 2013/0291853 A1* | 11/2013 | Braden | ................ E05D 7/0423 | 312/326 |

FOREIGN PATENT DOCUMENTS

| | | | | |
|---|---|---|---|---|
| CN | 2869252 Y * | 2/2007 | | |
| EP | 2128369 A2 * | 12/2009 | ............ | E05F 1/1276 |

* cited by examiner

*Primary Examiner* — Matthew W Ing
(74) *Attorney, Agent, or Firm* — Price Heneveld LLP

(57) ABSTRACT

An appliance includes an appliance body defining a cavity. A front panel defines a connector slot. A hinge arm is configured to be pivotally coupled with the appliance body and includes an arm body defining an arm receiving well. A flange extends from the arm body and is configured to be received by the connector slot. A door includes a rail defining a rail receiving well and a channel configured to receive the hinge arm so that the rail receiving well is aligned with the arm receiving well. A fastener is configured to be received by the arm and rail receiving wells to fixedly couple the hinge arm within the channel of the rail. A guide is coupled with the front panel and defines an aperture aligned with the connector slot. First and second wings are configured to frame the flange when the flange is received by the connector slot.

18 Claims, 11 Drawing Sheets

APPLIANCE DOOR HINGE ASSEMBLY

FIELD OF DISCLOSURE

The present disclosure generally relates to an appliance door assembly, and more specifically, to an adjustable hinge assembly for an appliance door.

BACKGROUND

Hinge assemblies are used on appliances to couple doors with cabinets. Often these hinge assemblies have limited tolerances for adjusting the door relative to the cabinet. A hinge assembly that accounts for variations in doors and cabinets and can be used across various appliances is described herein.

SUMMARY OF THE DISCLOSURE

According to one aspect of the present disclosure, an appliance includes an appliance body that defines a cavity. A front panel defines a connector slot. A hinge arm is configured to be pivotally coupled with the appliance body. The hinge arm includes an arm body that defines an arm receiving well. A flange extends from the arm body and is configured to be received by the connector slot. A door includes a rail that defines a channel and a rail receiving well. The channel is configured to receive the hinge arm so that the rail receiving well is aligned with the arm receiving well. A fastener is configured to be received by the arm receiving well and the rail receiving well to fixedly couple the hinge arm within the channel of the rail. A guide is coupled with the front panel. The guide defines an aperture aligned with the connector slot and includes first and second wings configured to frame the flange when the flange is received by the connector slot.

According to another aspect of the present disclosure, an appliance includes a front panel that defines first and second connector slots positioned on opposing sides of the front panel. A guide is operably coupled with a rear surface of the front panel. The guide includes a guide body that defines an aperture. The guide body is positioned to align the aperture with one of the first and second connector slots. First and second wings extend from the guide body at a predetermined angle. The predetermined angle is selected to position the first and second wings to abut the flange and prevent horizontal movement of the flange within the connector slot. A hinge arm is configured to be pivotally coupled with the appliance body. The hinge arm includes a flange configured to be received by one of the first and second connector slots.

According to yet another aspect of the present disclosure, an appliance includes a front panel that defines a connector slot positioned on a side of the front panel. A hinge support member is operably coupled with a rear surface of the front panel. The hinge support member includes an inner member that is slidably coupled with an outer member and positioned proximate the connector slot. A mechanical fastener is configured to provide vertical translation of the inner member relative to the outer member. A guide is operably coupled with the hinge support member and includes a guide body that defines an aperture. The aperture is at least partially aligned with the connector slot. First and second opposing wings extend from the guide body. A hinge arm includes a flange configured to be received by the connector slot. The first and second opposing wings of the guide are configured to provide a force to opposing sides of the flange to prevent horizontal movement of the flange within the connector slot.

These and other features, advantages, and objects of the present disclosure will be further understood and appreciated by those skilled in the art by reference to the following specification, claims, and appended drawings.

Figure 1:
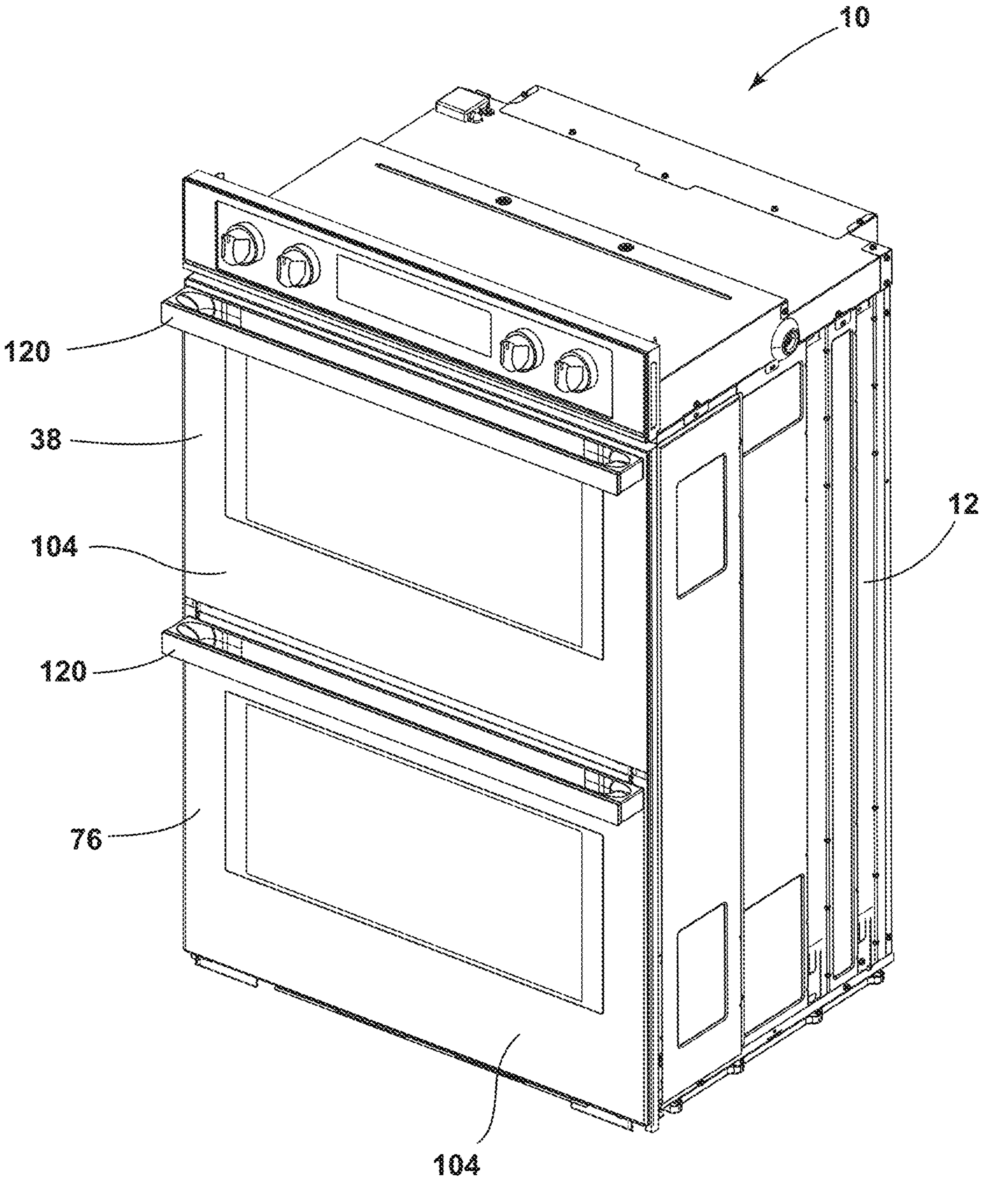
FIG. 1 is a side perspective view of an oven appliance including a pair of doors, according to various examples.

The components in the figures are not necessarily to scale, emphasis instead being placed upon illustrating the principles described herein.

DETAILED DESCRIPTION

The present illustrated embodiments reside primarily in combinations of method steps and apparatus components related to an appliance door. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms “including,” “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by “comprises a . . . ” does not, without more constraints, preclude the existence of additional identical elements in the process, method, article, or apparatus that comprises the element.

Referring to FIGS. 1-16, reference numeral 10 generally designates an appliance that includes an appliance body 12. The appliance body 12 defines a cavity 14 and has a front panel 16 that defines first and second connector slots 18, 20. First and second hinge arms 22, 24 are configured to be pivotally coupled with the appliance body 12. The first hinge arm 22 includes a first arm body 26 defining a first arm receiving well 28 and a first flange 30 extending from the first arm body 26, and the second hinge arm 24 includes a second arm body 32 defining a second arm receiving well 34. A second flange 36 extends from the second arm body 32. The first flange 30 is configured to be received by the first connector slot 18, and the second flange 36 is configured to be received by the second connector slot 20. A door 38 is configured to be coupled with the appliance body 12. The door 38 includes first and second rails 40, 42. The first rail 40 defines a first rail channel 44 and a first rail receiving well 46, and the second rail 42 defines a second rail channel 48 and a second rail receiving well 50. The first rail channel 44 is configured to receive the first hinge arm 22, and the second rail channel 48 is configured to receive the second hinge arm 24. The first arm receiving well 28 is aligned with the first rail receiving well 46, and the second arm receiving well 34 is aligned with the second rail receiving well 50. One of a plurality of fasteners 52 is configured to fixedly couple the first hinge arm 22 with the first rail 40, and another of the plurality of fasteners 52 is configured to fixedly couple the second hinge arm 24 with the second rail 42. A guide 54 is coupled with a rear surface 56 of the front panel 16. The guide 54 defines an aperture 58 aligned with one of the first and second connector slots 18, 20 and includes first and second wings 60, 62 configured to frame the flange 30, 36 when the flange 30, 36 is received by the first or second connector slot 18, 20.

Figure 2:
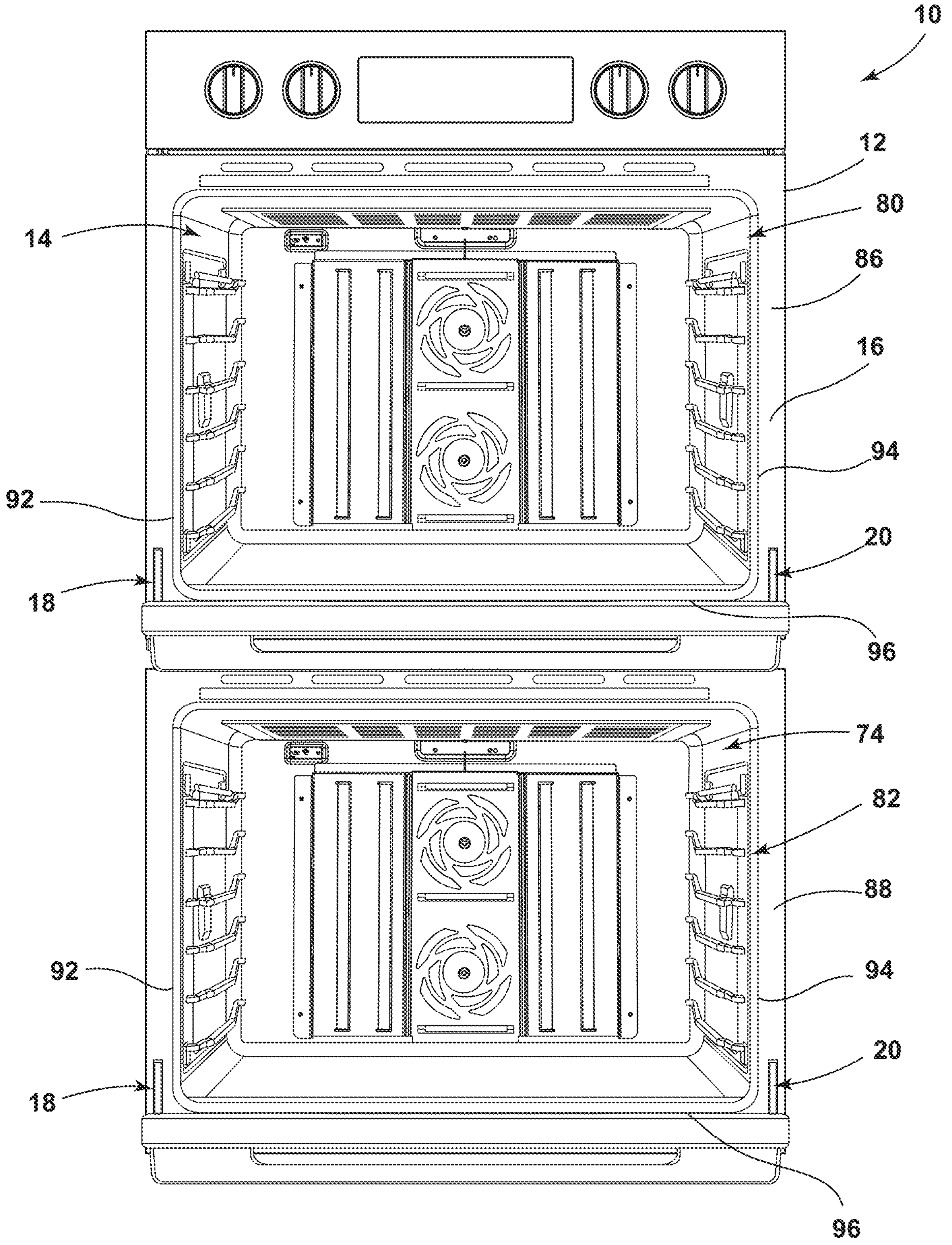
FIG. 2 is a front elevation view of the oven appliance of FIG. 1 with the pair of doors removed.

Referring now to FIGS. 1 and 2, the appliance 10 is illustrated including the appliance body 12 defining a primary cavity 14 and a secondary cavity 74. As illustrated in FIG. 1, a first door 38 is positioned to selectively seal the primary cavity 14, and a second door 76 is positioned to selectively seal the secondary cavity 74. Each of the first and second doors 38, 76 is hingedly coupled with the appliance body 12 and movable between an open position and a closed position. When the first door 38 is in the open position, the primary cavity 14 is accessible through a first opening 80 defined by the front panel 16. When the second door 76 is in the open position, the secondary cavity 74 is accessible through a second opening 82 defined by the front panel 16. In various examples, the front panel 16 may include a first portion 86 defining the first opening 80 and a second portion 88 defining the second opening 82. In other examples, the front panel 16 may be a singular piece defining both the first and second openings 80, 82. It will be understood that the appliance body 12 encloses components typically found in a conventional cooking oven, such as electrical components, heating elements, gas lines, valves, control units, burner elements, broiled elements, and the like. Such components will not be described further herein except where necessary for a complete understanding of the aspects of the present disclosure.

For the remainder of the disclosure, reference will be made only to the primary cavity 14 and the first door 38 and the features directly relevant to these components. It will be understood that the same features described with respect to the primary cavity 14 and the first door 38 may apply to the secondary cavity 74 and the second door 76 without departing from the scope of the present disclosure. Referring again to FIGS. 1 and 2, the front panel 16 defines the first and second connector slots 18, 20. The first and second connector slots 18, 20 are defined proximate opposing edges 92, 94 of the first opening 80. Each of the first and second connector slots 18, 20 may be elongated and may extend upward from proximate a lower edge 96 of the opening 80. For example, each of the first and second connector slots 18, 20 may have a rectangular shape, as illustrated in FIG. 2. Each of the first and second connector slots 18, 20 has a first width W1 and is configured to at least partially receive one of the first and second flanges 30, 36, as discussed in more detail elsewhere herein.

Figure 3:
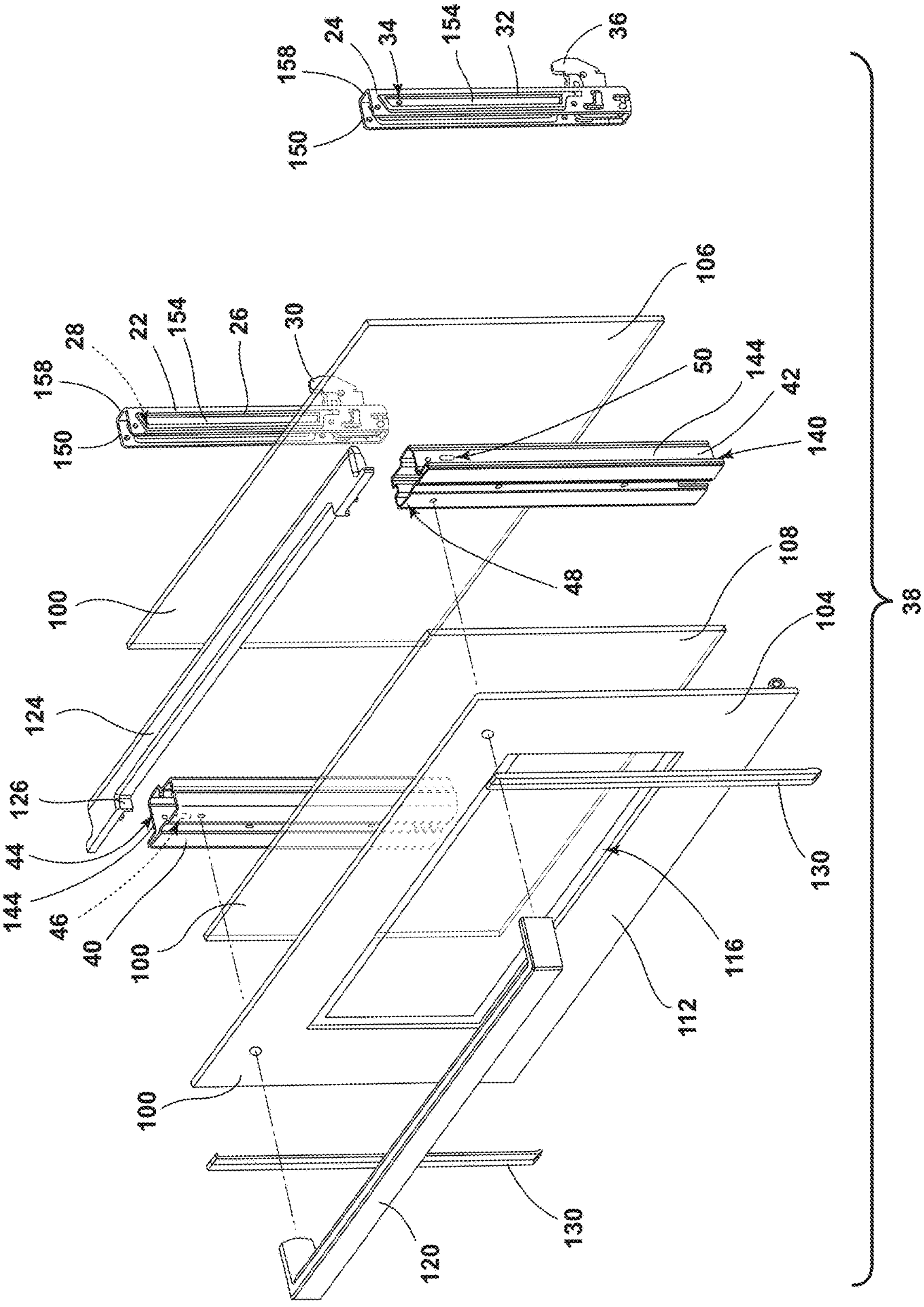
FIG. 3 is a top exploded view of one of the pair of doors of FIG. 1.

Referring now to FIG. 3, an exemplary form of the primary door 38 is illustrated disassembled. The door 38 includes a plurality of panels 100 in a spaced-apart configuration. The plurality of panels 100 includes a front panel 104 and a rear panel 106. In various examples, the plurality of panels 100 may further include an intermediate panel 108. At least one of the plurality of panels 100 is a glass panel. It is contemplated that all of the plurality of panels 100 may be configured as glass panels.

A masking 112 is positioned to define a window 116 of the door 38 within the front panel 104. A handle 120 is coupled with the front panel 104 and configured to move the door 38 between an open position and a closed position. The first and second rails 40, 42 are operably coupled with at least one of the plurality of panels 100 and are configured to provide structural support for the door 38. In various examples, the first and second rails 40, 42 may be positioned between two of the plurality of panels 100 (e.g., between the front panel 104 and the rear panel 106) and may provide structural support for the door 38. The intermediate panel 108 may be positioned between the front panel 104 and the rear panel 106 and may extend between the first and second rails 40, 42. Each of the first and second rails 40, 42 may define slots for aligning the plurality of panels 100. The plurality of panels 100 may be aligned and secured by a top member 124 of the door 38. The top member 124 may include a perimeter wall 126 and may be positioned over a top edge of each of the plurality of panels 100 and may extend between the first and second rails 40, 42. The perimeter wall 126 may be configured to encompass the door 38 and secure the plurality of panels 100 between the first and second rails 40, 42. In various examples, the plurality of panels 100 may be further retained by edging 130 coupled with one or more of the plurality of panels 100.

Referring now to FIG. 3, as introduced above, the first rail 40 defines the first rail channel 44, and the second rail 42 defines the second rail channel 48. Each of the first and second channels 44, 48 extends the length of the respective rail 40, 42 and includes at least one open end 140. Each of the first and second rails 40, 42 further includes an exterior sidewall 144. The exterior sidewall 144 of the first rail 40 defines the first rail receiving well 46, and the exterior sidewall 144 of the second rail 42 defines the second rail receiving well 50. The first and second rail receiving wells 46, 50 may be positioned at any point along the exterior sidewall 144 of the respective rail 40, 42. Each of the first and second rail receiving wells 46, 50 may be elongated. For example, the first and second rail receiving wells 46, 50 may be generally obround or oblong. In various examples, only one of the first and second rail receiving wells 46, 50 may be elongated. In other examples, both of the first and second rail receiving wells 46, 50 may be elongated and may be configured to mirror each other. The elongated shape of the first and second rail receiving wells 46, 50 is configured to accommodate adjustment of the respective hinge arm 22, 24 within the first and second channels 44, 48 along an axis of the respective rail 40, 42.

Referring still to FIG. 3, the first rail 40 corresponds with the first hinge arm 22 and the second rail 42 corresponds with the second hinge arm 24. As introduced previously, the first hinge arm 22 includes the first arm body 26, and the second hinge arm 24 includes the second arm body 32. The first and second arm bodies 26, 32 may be elongated. Each of the first and second arm bodies 26, 32 includes first and second sidewalls 150, 154 joined by a rear wall 158. The outermost sidewall of the first and second sidewalls 150, 154 of the first hinge arm 22 defines the first arm receiving well 28, and the outermost sidewall of the first and second sidewalls 150, 154 of the second hinge arm 24 defines the second arm receiving well 34. In various examples, each of the first and second arm receiving wells 28, 34 may be elongated. In other examples, only one of the first and second arm receiving wells 28, 34 may be elongated. In still other examples, the first and second arm receiving wells 28, 34 may be generally circular.

Figure 4:
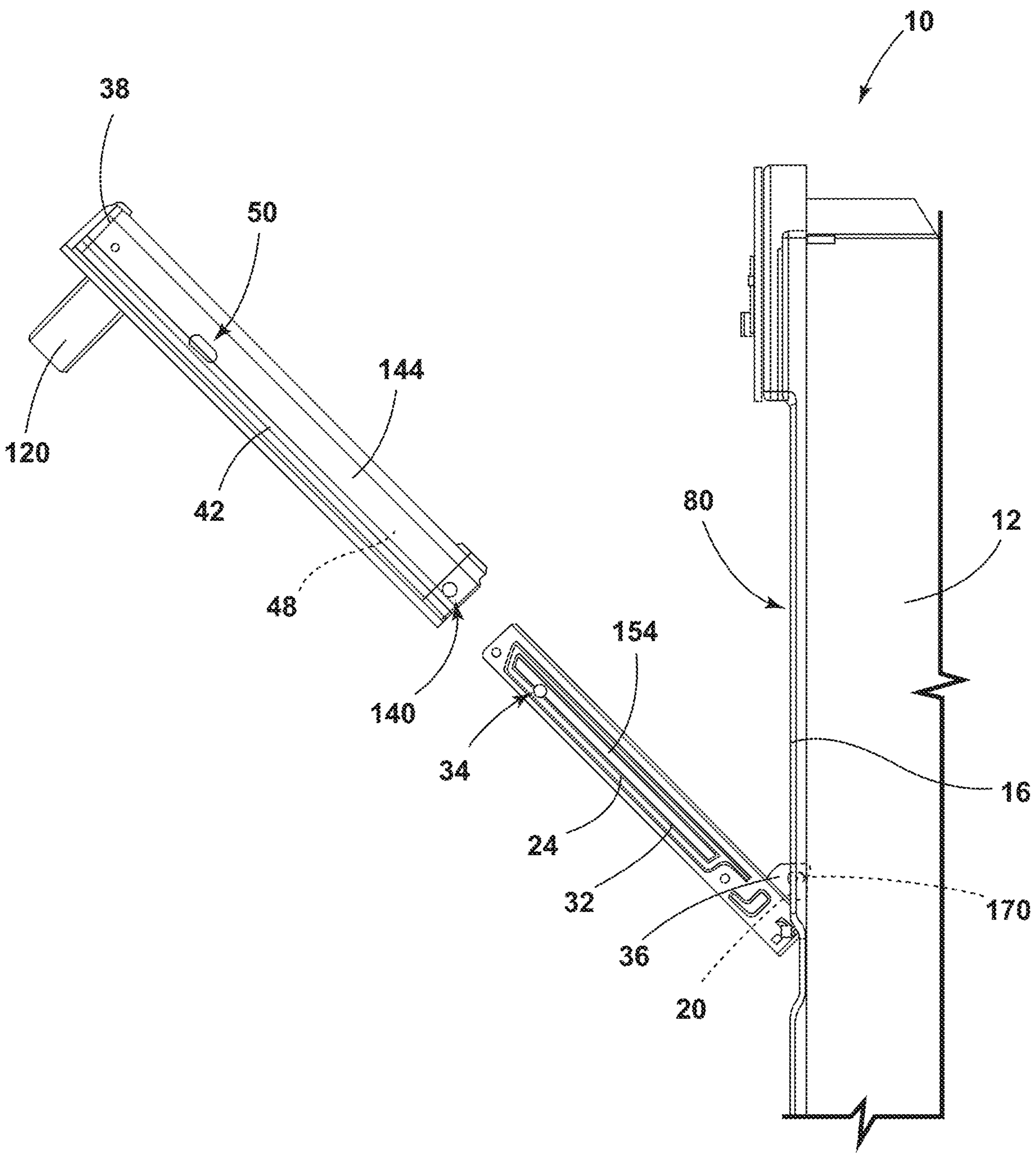
FIG. 4 is a side profile view of the oven appliance of FIG. 1 prior to engagement with one of the pair of doors.
Figure 5:
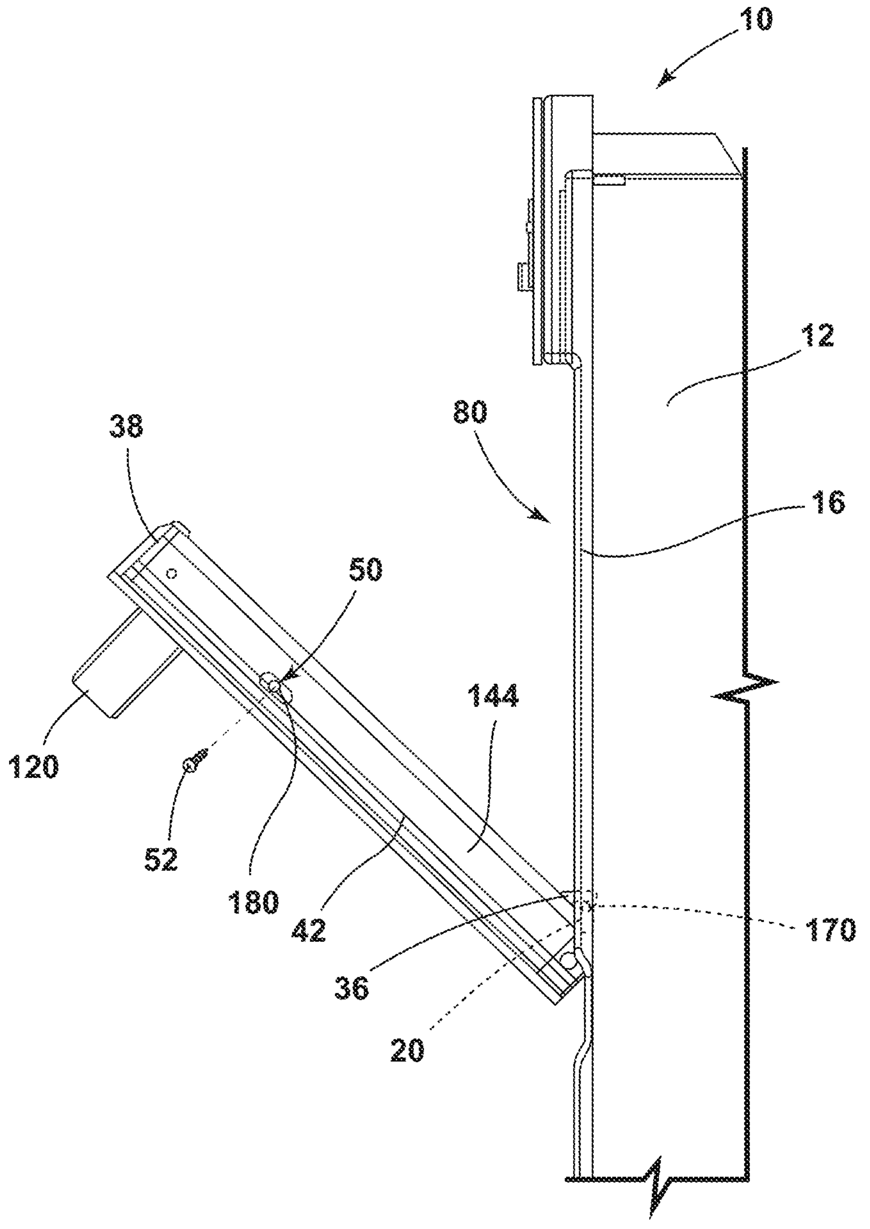
FIG. 5 is a side profile view of the oven appliance of FIG. 1 with one of the pair of doors engaged and in an intermediate position.
Figure 6:
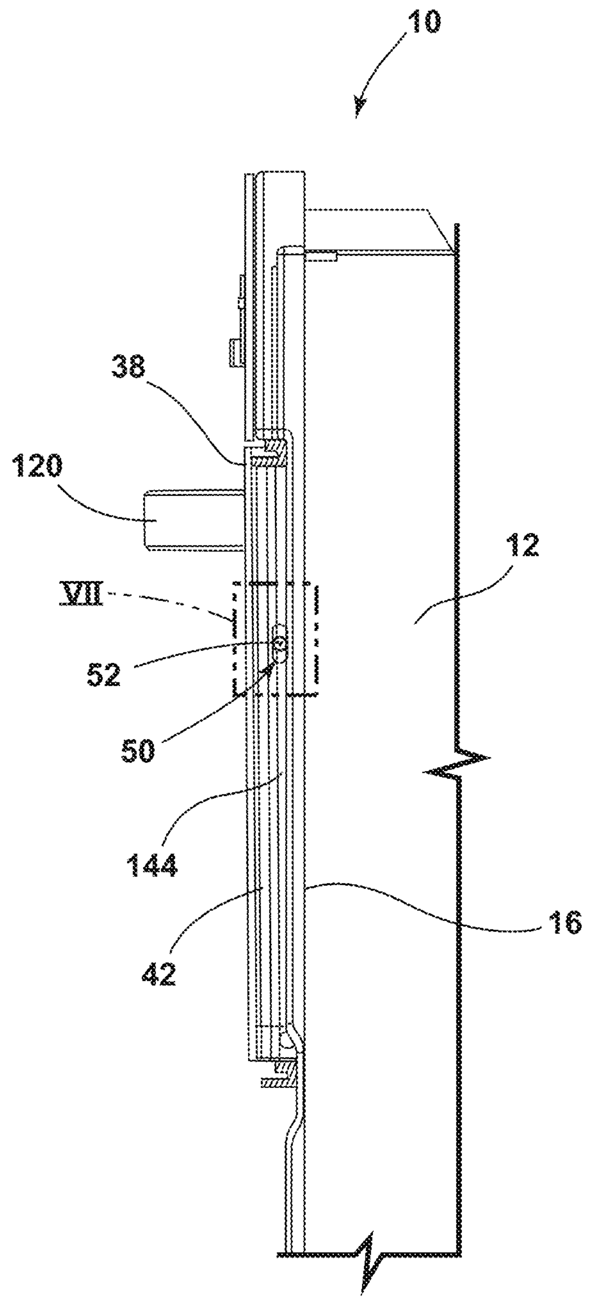
FIG. 6 is a side profile view of the oven appliance of FIG. 1 with one of the pair of doors in a closed position.

Referring now to FIGS. 4-6, the first door 38 is illustrated in various stages of assembly as viewed from the second side, which includes the second hinge arm 24 and the second rail 42. It will be understood that the assembly of the first side, which includes the first hinge arm 22 and the first rail 40 may be assembled in a similar way. As illustrated in FIG. 4, in assembly, the door 38 is positioned so that the second hinge arm 24 is aligned with the second channel 48 of the second rail 42. The second hinge arm 24 is coupled with the front panel 16. Specifically, the second flange 36 is received by the second connector slot 20 to hingedly couple the second rail 42 with the appliance body 12. The second flange 36 includes a second width W2 that is less than the first width W1 of the second connector slot 20. It will be understood that the first flange 30 and the first connector slot 18 may have the same widths W1, W2 as the second flange 36 and the second connector slot 20, respectively.

The second flange 36 extends from the second arm body 32 of the second rail 42. The second flange 36 extends from a lower end of the second arm body 32 and may be positioned spaced-apart from a lower edge of the second arm body 32 or may be positioned aligned with the lower edge of the second arm body 32. In various examples, the second flange 36 may be generally hook-shaped and configured to receive a striker 170. The striker 170 may be positioned proximate the front panel 16 and may extend across the second connector slot 20. When the second flange 36 is inserted into the second connector slot 20, the second flange 36 is rotatably engaged with the striker 170 and pivotally couples the second hinge arm 24 with the appliance body 12.

As illustrated in FIG. 5, when the second hinge arm 24 is coupled with the appliance body 12, the door 38 is lowered so that the second hinge arm 24 is received by the second channel 48 of the second rail 42. When the second hinge arm 24 is received by the second channel 48, the second hinge arm 24 is adjustable to align the second rail receiving well 50 with the second arm receiving well 34. To align the second rail receiving well 50 and the second arm receiving well 34, the second hinge arm 24 is slidably along an axis of the second rail 42. This slidable engagement allows for adjustment of the second hinge arm 24 within the second channel 48 of the second rail 42 to ensure proper vertical positioning of the door 38 relative to the appliance body 12. When the vertical positioning is fully adjusted, a fastener 52 may be inserted through the second rail receiving well 50 and the second arm receiving well 34 to fixedly couple the second hinge arm 24 within the second channel 48 of the second rail 42.

Figure 7:
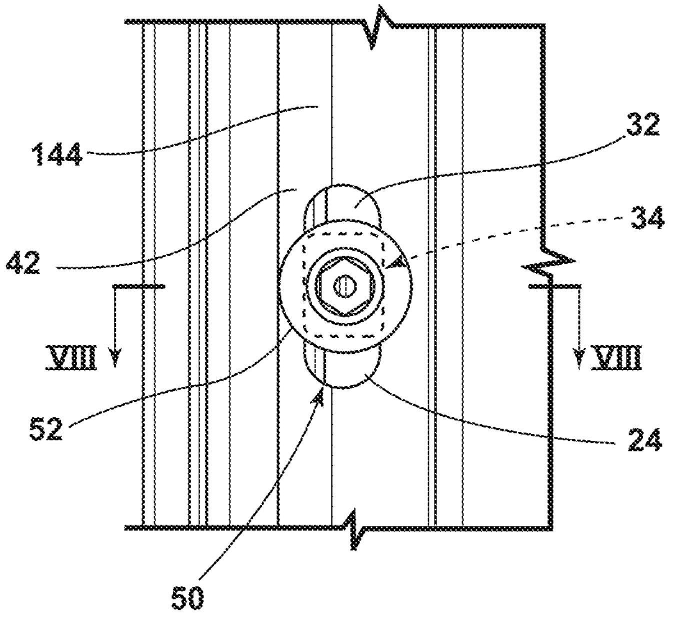
FIG. 7 is an enlarged view of section VII of FIG. 6.
Figure 8:
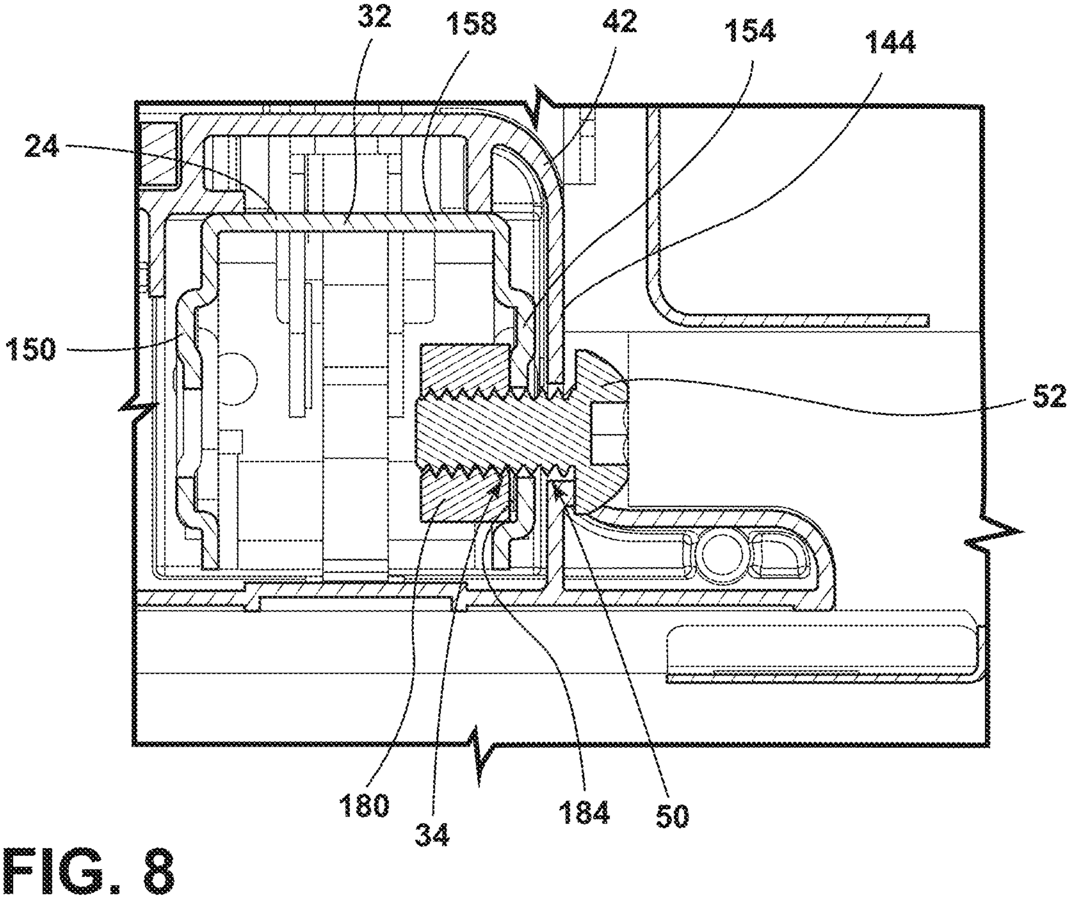
FIG. 8 is a cross-sectional view taken along line VIII-VIII of FIG. 7.

Referring now to FIGS. 6-8, when the fastener 52 is inserted through the second rail receiving well 50 and the second arm receiving well 34, the fastener 52 is further received by a bolt 180. The bolt 180 is fixedly coupled to an interior surface 184 of the second hinge arm 24 and is aligned with the second arm receiving well 34. When the fastener 52 is received by the bolt 180, the second hinge arm 24 is coupled with the second rail 42 and is no longer translatable along the second rail 42. This ensures that the proper vertical positioning of the door 38 relative to the appliance body 12 is maintained.

Figure 9:
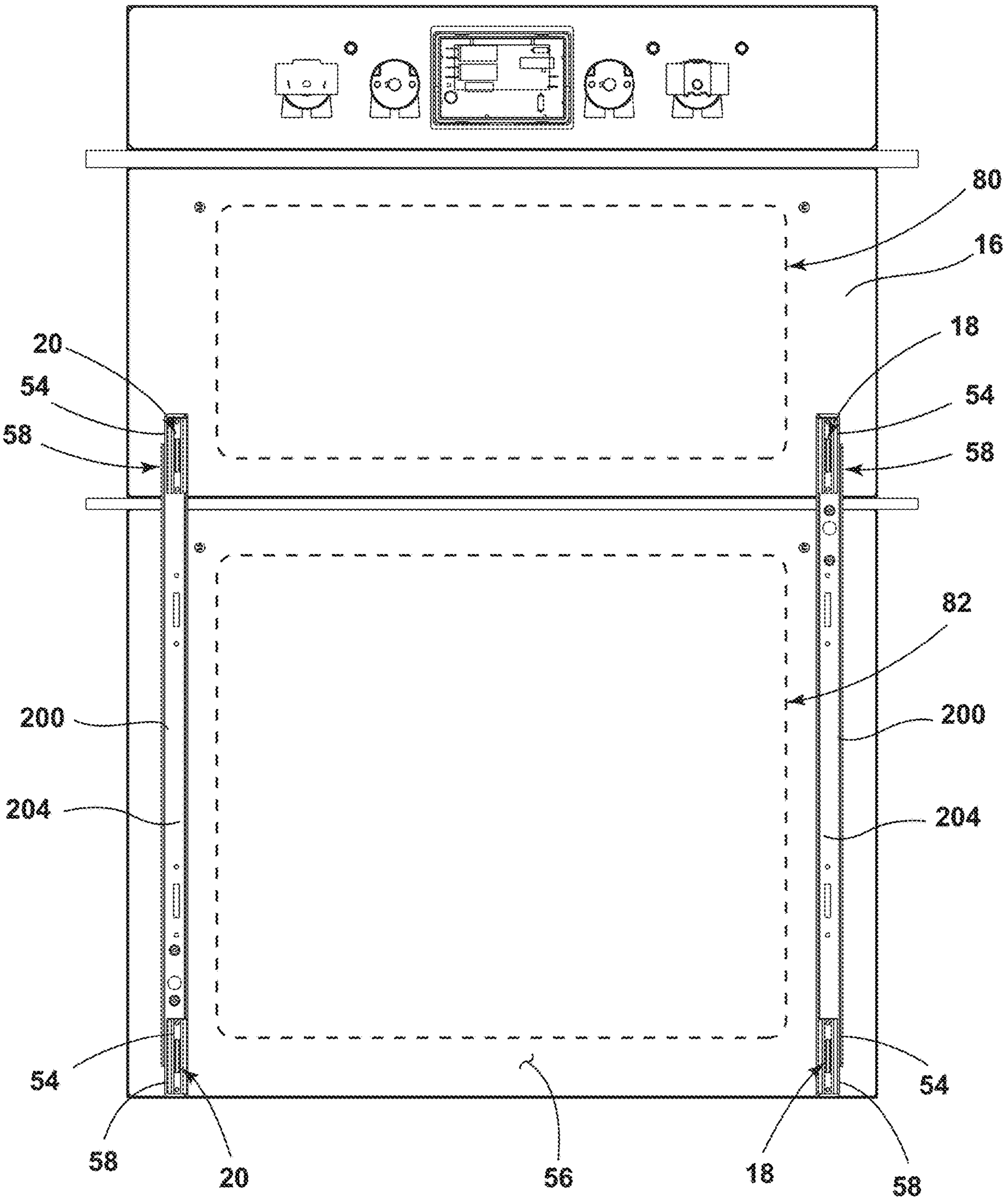
FIG. 9 is a rear view of a front panel of an appliance, according to various examples.
Figure 10:
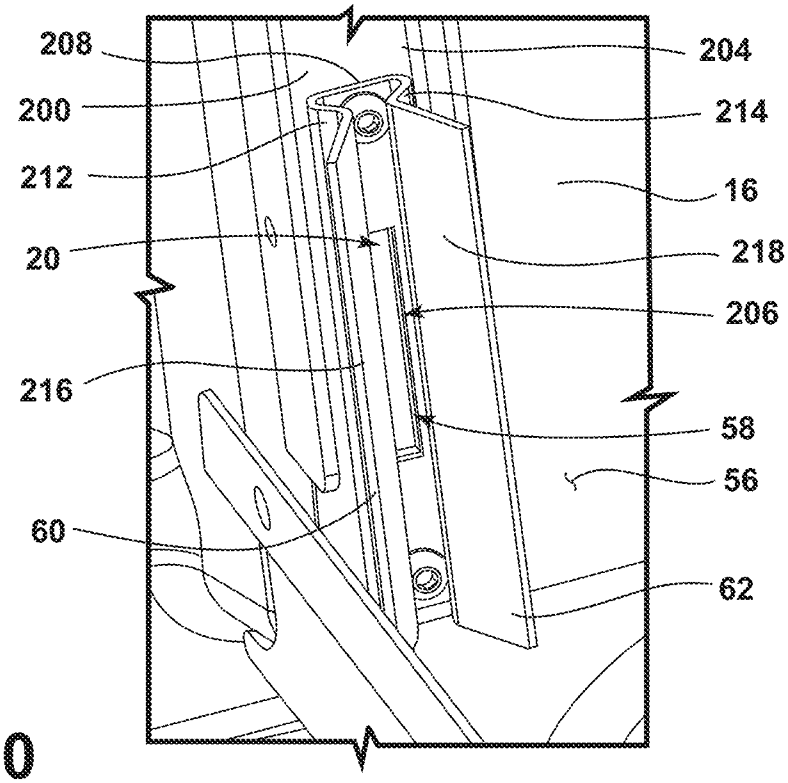
FIG. 10 is a side perspective view of a guide positioned on a rear surface of a front panel of an appliance prior to a hinge member being engaged with the front panel, according to various examples.
Figure 11:
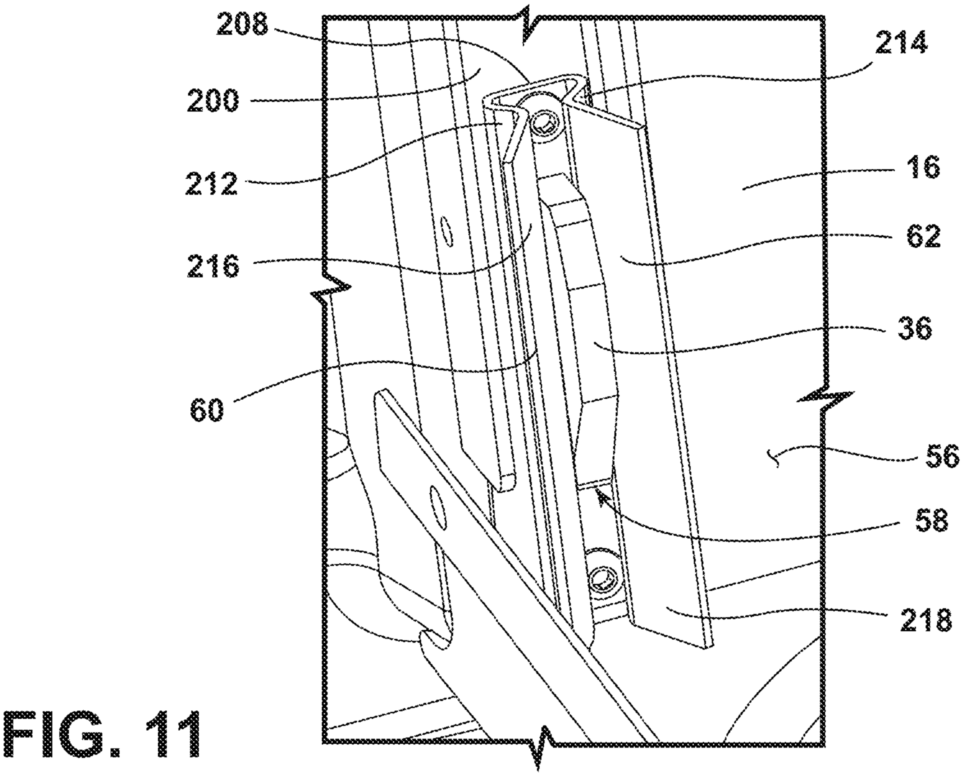
FIG. 11 is a side perspective view of the guide of FIG. 10 with the hinge member engaged with the front panel.
Figure 12:
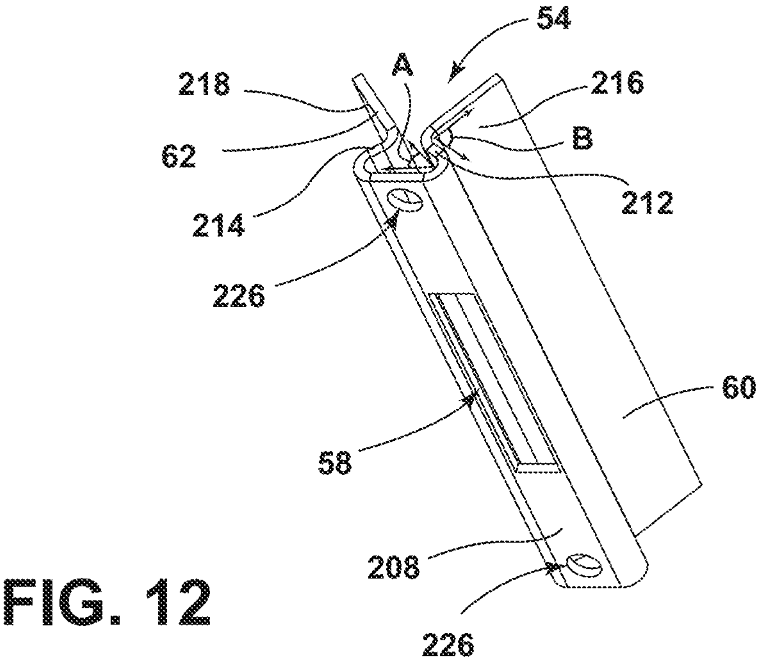
FIG. 12 is a side perspective view of the guide of FIG. 10.

Referring now to FIG. 9, a rear view of the front panel 16 of the appliance 10 is illustrated according to various examples. At least one hinge support member 200 may be positioned on the rear surface 56 of the front panel 16. In various examples, one hinge support member 200 may be positioned proximate the first connector slot 18 and another hinge support member 200 may be positioned proximate the second connector slot 20. The hinge support members 200 are configured to provide support and horizontal alignment for the first and second hinge arms 22, 24 (FIG. 3) when the first and second hinge arms 22, 24 are coupled with the appliance body 12. Where first and second doors 38, 76 are used, the hinge support member 200 may be configured to provide support for one or both of the first and second doors 38, 76.

Each of the hinge support members 200 includes a support body 204. The support body 204 is generally elongated and may be configured to extend the entire height of the front panel 16 or only a portion of the front panel 16. For example, the support body 204 extends along one of the first and second sides of the front panel 16 of the appliance body 12. In other examples, the support body 204 may extend along the rear surface 56 of the front panel 16 so that a first end of the support body 204 is positioned proximate the first opening 80 and a second end of the support body 204 is positioned proximate the second opening 82.

The support body 204 may define a plurality of receiving spaces 206 spaced along the length of the support body 204. It will be understood than any number of receiving spaces 206 may be defined by the support body 204 without departing from the scope of the present disclosure. At least one of the plurality of receiving spaces 206 is configured to align with one of the first and second connector slots 18, 20. In various examples, where there is a first connector slot 18 proximate the first opening 80 and a first connector slot 18 proximate the second opening 82, one of the plurality of receiving spaces 206 may be configured to align with the first connector slot 18 proximate the first opening 80 and another of the plurality of receiving spaces 206 may be configured to align with the first connector slot 18 proximate the second opening 82. Each of the plurality of receiving spaces 206 may be the same size as one or both of the first and second connector slots 18, 20. Alternatively, each of the plurality of receiving spaces 206 may be larger or smaller than one or both of the first and second connector slots 18, 20. The plurality of receiving spaces 206 may uniform in size, or the size of one or more of the plurality of receiving spaces 206 may be varied.

A guide 54 may be coupled with the support body 204 proximate at least one of the first and second connector slots 18, 20. The guide 54 includes a guide body 208 coupled with the support body 204 of the hinge support member 200. The guide body 208 may be generally elongated and may be sized to complement a portion of the support body 204. The guide body 208 defines an aperture 58 configured to be aligned with one of the plurality of receiving spaces 206 of the support body 204. The aperture 58 is further aligned with one of the first and second connector slots 18, 20. The aperture 58 is sized to receive one of the first and second flanges 30, 36 of the first and second hinge arms 22, 24. The guide body 208 may further define a plurality of receiving wells 226 configured to be receive fasteners to couple the guide body 208 with the front panel 16 and/or the support member 200.

The guide 54 further includes first and second opposing wings 60, 62. The first and second opposing wings 60, 62 are positioned to frame the aperture 58. The first wing 60 includes a first inner portion 212 integrally formed with the guide body 208 at a first edge of the guide body 208, and the second wing 62 includes a second inner portion 214 integrally formed with the guide body 208 at a second edge of the guide body 208. In other words, the first and second inner portions 212, 214 are integrally formed with opposing edges of the guide body 208. Each of the first and second inner portions 212, 214 extend toward a centerline of the guide body 208 at a predetermined angle A relative to the guide body 208. In various examples, the predetermined angle is an acute angle. The first wing 60 further includes a first outer portion 216 integrally formed with the first inner portion 212. The first outer portion 216 extends outward and away from the centerline of the guide body 208 and forms an outer angle relative to the first inner portion 212. Likewise, the second wing 62 further includes a second outer portion 218 integrally formed with the second inner portion 214. The second outer portion 218 extends outward from the centerline in an opposite direction from the first outer portion 216 and forms an acute angle B relative to the second inner portion 214.

Where the first inner portion 212 meets the first outer portion 216, the first wing 60 includes a vertex. The second wing 62 also includes a vertex where the second inner portion 214 meets the second outer portion 218. The predetermined angle A is selected to position the vertices of the wings 60, 62 to be spaced-apart to receive one of the first and second flanges 30, 36. The vertices of the wings 60, 62 are spaced-apart to have a third width W3 that is less than the second width W2 of each of the flanges 30, 36. The third width W3 may be substantially equal to the first width W1 of the first and second connector slots 18, 20. Alternatively, the third width W3 between the first and second wings 60, 62 may be less than the first width W1 and the second width W2.

The first and second wings 60, 62 may be substantially flexible such that the first and second wings 60, 62 may be biased apart by one of the first and second flanges 30, 36. The wings 60, 62 then apply a force to opposing sides of the flange 30, 36 when the flange 30, 36 is received by the respective connector slot 18, 20 and positioned between the wings 60, 62. The force is applied to either side of the flange 30, 36 to ensure that the door 38 is centrally aligned. The force applied by the first and second wings 60, 62 also prevents lateral movement of the door 38 relative to the appliance body 12, preventing movement when the door 38 is in use. In other words, the force prevents horizontal movement of the flange 30, 36 within the connector slot 18, 20. It will be understood that the plurality of guides 54 may be used with the door 38 as described or with any other door configuration without departing from the scope of the present disclosure.

Figure 13:
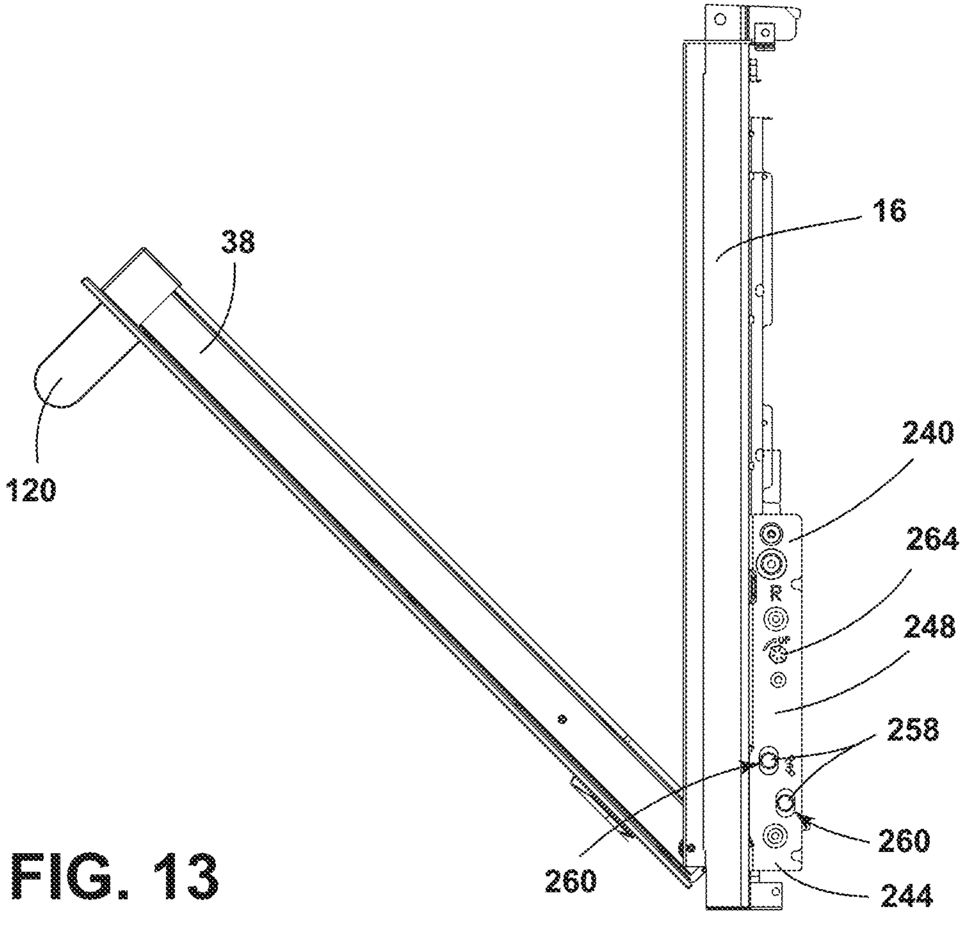
FIG. 13 is a side elevational view of an appliance with a side panel removed and including a hinge support, according to various examples.
Figure 14:
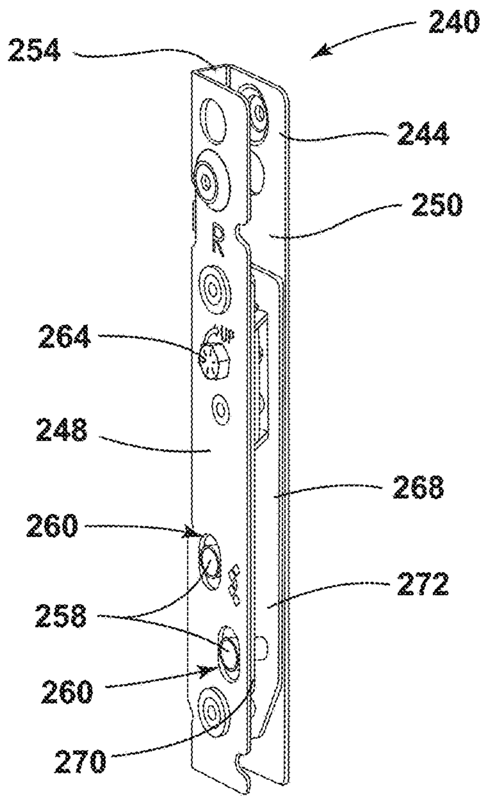
FIG. 14 is a side perspective view of the hinge support of FIG. 13.
Figure 15:
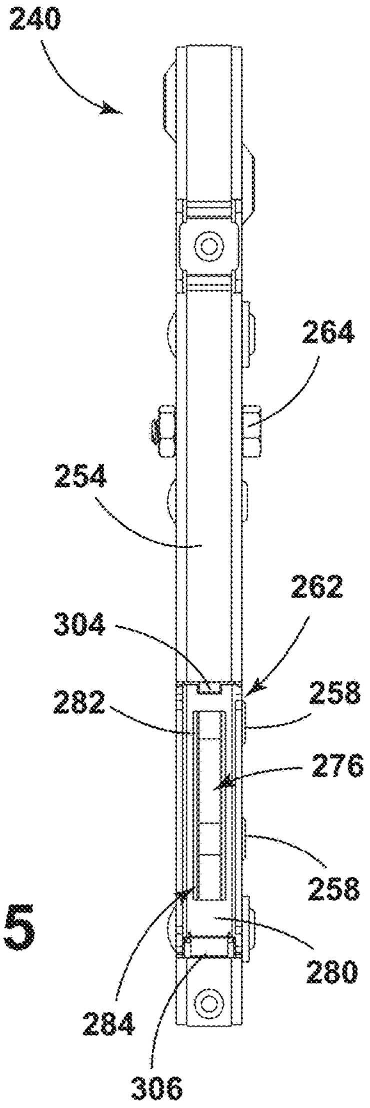
FIG. 15 is a rear elevation view of the hinge support of FIG. 13 including a guide.
Figure 16:
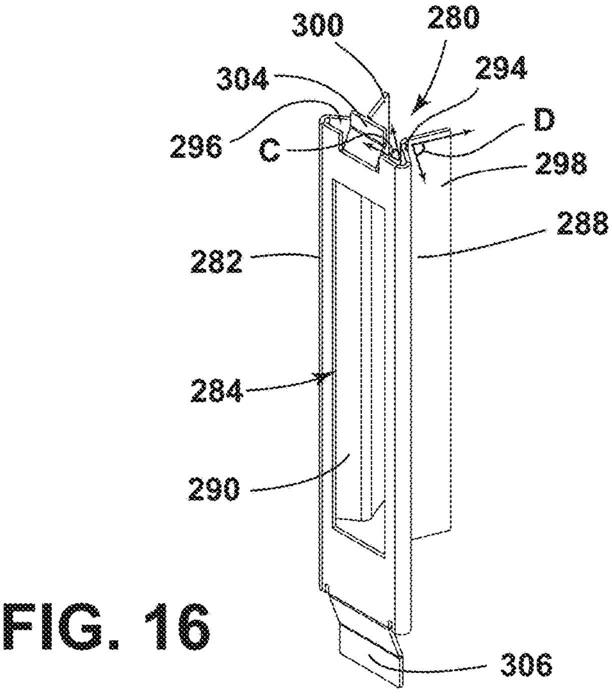
FIG. 16 is a side perspective view of the guide of FIG. 15.

Referring now to FIGS. 13-15, a hinge support member 240 that has an outer member 244 slidably coupled with an inner member 268 is illustrated according to various examples. The outer member 244 includes first and second sidewalls 248, 250 joined by a front wall 254. The front wall 254 is positioned substantially flush with the rear surface 56 of the front panel 16 of the appliance body 12. The front wall 254 of the outer member 244 defines an opening 262 sized to receive a guide 280, as discussed in more detail elsewhere herein.

As illustrated in FIGS. 14 and 15, the inner member 268 also includes first and second sidewalls 270, 272 positioned parallel with and substantially flush with the first and second sidewalls 248, 250 of the outer member 244. The inner member 268 is positioned proximate one of the first and second connector slots 18, 20. The inner member 268 of the hinge support member 240 is vertically adjustable by a mechanical fastener 264 positioned on an outer surface of one of the first and second sidewalls 248, 250 of the hinge support member 240. In other words, the mechanical fastener 264 is configured to provide vertical translation of the inner member 268 relative to the outer member 244. It will be understood that the mechanical fastener 264 may be any mechanical fastener including, for example, a screw or slider.

A plurality of strikers 258 are operably coupled between the first and second sidewalls 270, 272 of the inner member 268. The plurality of strikers 258 are configured to be positioned such that one of the plurality of strikers 258 is aligned with one of the first and second connector slots 18, 20. The plurality of strikers 258 are movable vertically to accommodate vertical variations of the door 38. The plurality of strikers 258 are moved until one of the plurality of strikers 258 is positioned proximate one of the first and second connector slots 18, 20. In various examples, an end of each of the plurality of strikers 258 may be received by one of a plurality of elongated openings 260 defined by the outer member 244 of the hinge support member 240. Each opening 260 may be sized to allow a predetermined amount of vertical adjustment of the plurality of strikers 258 relative to the outer member 244.

A hinge receiving space 276 is defined by the inner member 268 of the hinge support member 240 and is aligned with the opening 262 defined by the outer member 244 of the hinge support member 240. The hinge receiving space 276 is further aligned with the respective connector slot 18, 20, and the one of the plurality of strikers 258 is positioned to extend across the hinge receiving space 276. The hinge receiving space 276 may be sized to complement the first and second connector slots 18, 20 or may be larger or smaller than the first and second connector slots 18, 20. The hinge receiving space 276 is sized to receive one of the first and second flanges 30, 36, as discussed in more detail below.

A guide 280 is coupled with the front wall 254 of the outer member 244 of the hinge support member 240 and is positioned proximate the hinge receiving space 276. The guide 280 is positioned forward of the plurality of strikers 258. The guide 280 includes a guide body 282 coupled with the front wall 254 of the outer member 244 of the hinge support member 240. The guide body 282 may be generally elongated and is configured to be positioned between the first and second sidewalls 248, 250 of the outer member 244. The guide body 282 may further be configured to be positioned between the first and second sidewalls 270, 272 of the inner member 268. The guide body 282 defines an aperture 284 configured to be aligned with the hinge receiving space 276 of the hinge support member 240. The aperture 284 is sized to receive one of the first and second flanges 30, 36 of the first and second hinge arms 22, 24. When the aperture 284, the hinge receiving space 276, the opening 262, and one of the first and second connector slots 18, 20 are aligned, the respective flange of the first and second flanges 30, 36 extends through the components and engages with one of the plurality of strikers 258.

The guide 280 further includes first and second opposing wings 288, 290 positioned to frame the aperture 284. The first wing 288 includes a first inner portion 294 integrally formed with the guide body 282 at a first edge of the guide body 282, and the second wing 290 includes a second inner portion 296 integrally formed with the guide body 282 at a second edge of the guide body 282. In other words, the first and second inner portions 294, 296 are integrally formed with opposing edges of the guide body 282. The first and second inner portions 294, 296 extend toward a centerline of the guide body 282 at a predetermined angle C. In various examples, the angle may be an acute angle. The first wing 288 further includes a first outer portion 298 integrally formed with the first inner portion 294. The first outer portion 298 extends outward and away from the centerline of the guide body 282 and forms an acute angle D relative to the first inner portion 294. Likewise, the second wing 290 further includes a second outer portion 300 integrally formed with the second inner portion 296. The second outer portion 300 extends outward from the centerline in an opposite direction from the first outer portion 298 and forms an acute angle relative to the first inner portion 294.

In various examples, the guide 280 includes at least one engagement feature formed as first and second tabs 304, 306. It is contemplated that any other engagement feature may be used without departing from the scope of the present disclosure. The first tab 304 extends from a top side of the guide body 282, and the second tab 306 extends from a bottom side of the guide body 282. The first and second tabs 304, 306 are positioned on the sides of the guide body 282 that are oriented perpendicularly to the first and second wings 288, 290. The first tab 304 and the second tab 306 are configured to snap-engage the guide 280 to the outer member 244 of the hinge support member 240 when the guide 280 is positioned within the opening 262. In other examples, the first and second tabs 304, 306 may be configured to be received by slots defined by the hinge support member 240.

Where the first inner portion 294 meets the first outer portion 298, the first wing 288 includes a first vertex, and, where the second inner portion 296 meets the second outer portion 300, the second wing 290 includes a second vertex. The first and second vertices of the wings 288, 290 are spaced-apart by the third width W3 to receive one of the first and second flanges 30, 36 having the second width W2. The predetermined angle C is selected to position the vertices of the wings 288, 290 to be spaced apart by the third width W3. The first and second wings 288, 290 may be substantially flexible such that the first and second wings 288, 290 may apply a force to one of the first and second flanges 30, 36 when the respective flange 30, 36 is received by the respective connector slot 18, 20. When the respective flange 30, 36 is positioned through the respective connector slot 18, 20, the wings 288, 290 are configured to apply the force to either side of the flange 30, 36 to ensure that the door 38 is centrally aligned. The force applied by the first and second wings 288, 290 prevents lateral movement of the door 38 relative to the appliance body 12, preventing movement when the door 38 is in use. It will be understood that the guide 280 may be used with the door 38 as described or with any other door configuration without departing from the scope of the present disclosure.

According to one aspect, an appliance has a vertically adjustable hinge assembly. The appliance includes an appliance body that defines a cavity and has a front panel. The front panel defines a connector slot. A hinge arm is configured to be pivotally coupled with the appliance body. The hinge arm includes an arm body that defines an arm receiving well. A flange extends from the arm body. The flange is configured to be received by the connector slot. A door includes a rail defining a channel and a rail receiving well. The channel is configured to receive the hinge arm so that the rail receiving well is aligned with the arm receiving well. A fastener is configured to be received by the arm receiving well and the rail receiving wells to fixedly couple the hinge arm within the channel of the rail. A guide is coupled with the front panel. The guide defines an aperture that is aligned with the connector slot. The guide includes first and second wings configured to frame the flange when the flange is received by the connector slot.

According to another aspect, a door includes a plurality of panels. The plurality of panels includes a glass panel.

According to another aspect, a rail is operably coupled with one of a plurality of panels.

According to another aspect, a connector slot is one of a pair of connector slots defined on opposing sides of a cavity.

According to another aspect, a bolt is fixedly coupled with an interior surface of a rail. The bolt is configured to receive a fastener.

According to another aspect, a guide includes a guide body that defines an aperture. First and second wings extend from the guide body at a predetermined angle. The predetermined angle is selected to provide a force to opposing sides of a flange to prevent horizontal movement of the flange within a connector slot.

According to another aspect, a rail receiving well is elongated to accommodate adjustment of a hinge arm within a channel along an axis of a rail.

According to another aspect, an appliance has a hinge support assembly. The appliance includes a front panel that defines first and second connector slots positioned on opposing sides of the front panel. A hinge arm is configured to be pivotally coupled with the appliance body. The hinge arm includes a flange configured to be received by one of the first and second connector slots. A guide is operably coupled with a rear surface of the front panel. The guide includes a guide body that defines an aperture. The guide is positioned to align the aperture with one of the first and second connector slots. First and second wings extend from the guide body at a predetermined angle. The predetermined angle is selected to position the first and second wings to abut the flange and prevent horizontal movement of the flange within the connector slot.

According to another aspect, one of first and second connector slots has a first width and a flange has a second width. The first width is greater than the second width.

According to another aspect, first and second wings are spaced-apart by a third width. The third width is substantially equivalent to a second width of a flange.

According to another aspect, a door includes a rail that defines a channel configured to receive a hinge arm. The hinge arm defines an arm receiving well and the rail defines a rail receiving well. The arm receiving well is configured to align with the rail receiving well when the hinge arm is received by the channel. A fastener is configured to be received by each of the arm receiving well and the rail receiving well to couple the hinge arm with the respective rail.

According to another aspect, a rail receiving well is elongated to accommodate adjustment of a hinge arm within a channel along an axis of a rail.

According to another aspect, each of first and second wings includes an inner portion and an outer portion. The inner portion extends toward a centerline of a guide, and the outer portion extends from the inner portion and away from the centerline of the guide.

According to another aspect, an appliance has a vertically adjustable hinge support assembly. The appliance includes a front panel that defines a connector slot positioned on a side of the front panel. A hinge support member is operably coupled with a rear surface of the front panel. The hinge support member includes an inner member that is slidably coupled with an outer member and is positioned proximate the connector slot. A mechanical fastener is configured to provide vertical translation of the inner member relative to the outer member. A guide is operably coupled with the hinge support member. The guide includes a guide body that defines an aperture. The aperture is at least partially aligned with the connector slot. First and second opposing wings extends from the guide body. A hinge arm includes a flange that is configured to be received by the connector slot. The first and second opposing wings of the guide are configured to provide a force to opposing sides of the flange to prevent horizontal movement of the flange within the connector slot.

According to another aspect, an inner member of a hinge support member includes a striker. A flange is configured to engage with the striker.

According to another aspect, an mechanical fastener is configured to adjust a position of a striker relative to a connector slot.

According to another aspect, an outer member defines an opening configured to receive a guide.

According to another aspect, a door includes a rail that defines a channel. The channel is configured to receive the hinge arm.

According to another aspect, each of first and second opposing wings includes an inner portion and an outer portion. The inner portion extends toward a centerline of the guide, and the outer portion extends from the inner portion and away from the centerline of the guide.

According to another aspect, a guide includes an engagement feature that extends from an edge of the guide body. The engagement features is configured to couple the guide with a hinge support member.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members, or connector, or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An appliance having a vertically adjustable hinge assembly, the appliance comprising:

an appliance body defining a cavity and having a front panel, the front panel defining a connector slot;

a hinge arm pivotally coupled with the appliance body and including:

an arm body defining an arm receiving well; and a flange extending from the arm body, wherein the flange is configured to be received by the connector slot;

a door including a rail defining a channel and a rail receiving well, wherein the channel is configured to receive the hinge arm so that the rail receiving well is aligned with the arm receiving well;

a fastener configured to be received by the arm receiving well and the rail receiving well to fixedly couple the hinge arm within the channel of the rail; and a guide coupled with the front panel, the guide defining an aperture aligned with the connector slot, wherein the guide includes first and second wings that flare away from one another and that are configured to frame the flange when the flange is received by the connector slot.

2. The appliance of claim 1, wherein the door includes a plurality of panels, and further wherein the plurality of panels includes a glass panel.

3. The appliance of claim 2, wherein the rail is operably coupled with one of the plurality of panels.

4. The appliance of claim 1, wherein the connector slot is one of a pair of connector slots defined on opposing sides of the cavity.

5. The appliance of claim 1, further comprising:

a bolt fixedly coupled with an interior surface of the rail, the bolt configured to receive the fastener.

6. The appliance of claim 1, wherein the guide includes a guide body defining the aperture, and further wherein the first and second wings extend from the guide body at a predetermined angle selected to provide a force to opposing sides of the flange to prevent horizontal movement of the flange within the connector slot.

7. The appliance of claim 1, wherein the rail receiving well is elongated to accommodate adjustment of the hinge arm within the channel along an axis of the rail.

8. An appliance having a hinge support assembly, the appliance comprising:

a front panel defining first and second connector slots positioned on opposing sides of the front panel;

a hinge arm configured to be pivotally coupled with the appliance body, wherein the hinge arm includes a flange configured to be received by one of the first and second connector slots; and a guide operably coupled with a rear surface of the front panel, the guide including:

a guide body defining an aperture and positioned to align the aperture with one of the first and second connector slots; and first and second wings extending from the guide body at a predetermined angle selected to position the first and second wings to abut the flange and prevent horizontal movement of the flange within the connector slot, wherein each of the first and second wings includes an inner portion and an outer portion, the inner portion extending toward a centerline of the guide and the outer portion extending from the inner portion and away from the centerline of the guide.

9. The appliance of claim 8, wherein one of the first and second connector slots has a first width and the flange has a second width, and further wherein the first width is greater than the second width.

10. The appliance of claim 9, wherein the first and second wings are spaced-apart by a third width, the third width substantially equivalent to the second width of the flange.

11. The appliance of claim 8, further comprising:

a door including a rail defining a channel configured to receive the hinge arm, wherein the hinge arm defines an arm receiving well and the rail defines a rail receiving well, the arm receiving well configured to align with the rail receiving well when the hinge arm is received by the channel; and a fastener configured to be received by each of the arm receiving well and the rail receiving well to couple the hinge arm with the respective rail.

12. The appliance of claim 11, wherein the rail receiving well is elongated to accommodate adjustment of the hinge arm within the channel along an axis of the rail.

13. An appliance having a vertically adjustable hinge support assembly comprising:

a front panel defining a connector slot positioned on a side of the front panel;

a hinge support member operably coupled with a rear surface of the front panel, the hinge support member including:

an inner member slidably coupled with an outer member and positioned proximate the connector slot; and a mechanical fastener configured to provide vertical translation of the inner member relative to the outer member;

a guide operably coupled with the hinge support member and including:

a guide body defining an aperture, the aperture at least partially aligned with the connector slot; and first and second opposing wings extending from the guide body; and a hinge arm including a flange configured to be received by the connector slot, wherein the first and second opposing wings of the guide are configured to provide a force to opposing sides of the flange to prevent horizontal movement of the flange within the connector slot, and wherein each of the first and second opposing wings includes an inner portion and an outer portion, the inner portion extending toward a centerline of the guide and the outer portion extending from the inner portion and away from the centerline of the guide.

14. The appliance of claim 13, wherein the inner member of the hinge support member includes a striker, and further wherein the flange is configured to engage with the striker.

15. The appliance of claim 14, wherein the mechanical fastener is configured to adjust a position of the striker relative to the connector slot.

16. The appliance of claim 13, wherein the outer member defines an opening configured to receive the guide.

17. The appliance of claim 13, further comprising:

a door including a rail defining a channel configured to receive the hinge arm.

18. The appliance of claim 13, wherein the guide includes an engagement feature extending from an edge of the guide body and configured to couple the guide with the hinge support member.

* * * * *